(12) United States Patent
Mullin

(10) Patent No.: US 9,392,768 B1
(45) Date of Patent: Jul. 19, 2016

(54) THROW AND FETCH EQUIPMENT AND SYSTEMS USING INTERCHANGEABLE PROJECTILE HOLDER ELEMENTS

(71) Applicant: Make Ideas, LLC, La Jolla, CA (US)

(72) Inventor: Keith Alan Mullin, La Jolla, CA (US)

(73) Assignee: Make Ideas, LLC, La Jolla, CA (US)

( * ) Notice: Subject to any disclaimer, the term of this patent is extended or adjusted under 35 U.S.C. 154(b) by 0 days.

(21) Appl. No.: 14/841,512

(22) Filed: Aug. 31, 2015

Related U.S. Application Data

(60) Provisional application No. 62/044,217, filed on Aug. 30, 2014.

(51) Int. Cl.
*A01K 15/02* (2006.01)
*A63B 59/02* (2006.01)
*F41B 3/04* (2006.01)

(52) U.S. Cl.
CPC . *A01K 15/02* (2013.01); *F41B 3/04* (2013.01); *A63B 59/20* (2015.10)

(58) Field of Classification Search
CPC ....... A63B 59/20; A63B 65/12; A01K 15/025
USPC ....... 119/707, 702; 273/123 R, 398; 473/510, 473/512, 513; 124/5
See application file for complete search history.

(56) References Cited

U.S. PATENT DOCUMENTS

| 755,117 | A | 3/1904 | Dunn |
|---|---|---|---|
| 838,257 | A | 12/1906 | Kinst |
| 930,918 | A | 8/1909 | Barry |
| 1,535,029 | A | 4/1925 | Murch |
| 1,582,811 | A | 4/1926 | Adler |
| 1,593,577 | A | 7/1926 | Kaiser |
| 1,674,294 | A | 6/1928 | O'Rourke |
| 1,865,173 | A | 6/1932 | Dickerman |
| 1,877,820 | A | 9/1932 | Costello |
| 1,946,373 | A | 2/1934 | Walsh |
| 2,135,232 | A | 11/1938 | Dawn |
| 2,237,748 | A | 4/1941 | Schwarzenzer |
| 2,670,958 | A | 3/1954 | Leiser et al. |
| 2,710,753 | A | 6/1955 | Lockwood |
| 2,935,323 | A | 5/1960 | Cummings |
| 3,048,399 | A | 8/1962 | Breitbach |
| D194,045 | S | 11/1962 | Hasselbusch |
| 3,111,314 | A | 11/1963 | Topper |
| 3,115,129 | A | 12/1963 | Merriman |
| 3,120,387 | A | 2/1964 | Weinstein |
| 3,214,168 | A | 10/1965 | Sauber |

(Continued)

*Primary Examiner* — Yvonne Abbott-Lewis
(74) *Attorney, Agent, or Firm* — Tillman Wright, PLLC; James D. Wright; David R. Higgins

(57) ABSTRACT

A throw and fetch system includes a universal handle, at least two projectiles, and at least two interchangeable projectile holder elements. A first projectile has a first size and/or shape, and a second projectile has a second size and/or shape. A first interchangeable projectile holder element has an interior that is sized and shaped to correspond to the size and shape of the first projectile, and a second interchangeable projectile holder element has an interior that is sized and shaped to correspond to the size and shape of the second projectile. In a first state the first projectile holder element is attached to a distal end of the universal handle such that the first projectile may be held then thrown therefrom by a user, and in a second state the second projectile holder element is attached such that the second projectile may be held then thrown therefrom by the user.

16 Claims, 7 Drawing Sheets

(56) References Cited

U.S. PATENT DOCUMENTS

| | | | |
|---|---|---|---|
| 3,236,521 | A | 2/1966 | Knott |
| 3,246,894 | A | 4/1966 | Salisbury |
| 3,268,226 | A | 8/1966 | Martino |
| 3,392,978 | A | 7/1968 | Wiest |
| 3,424,461 | A | 1/1969 | Kirk |
| 3,428,036 | A | 2/1969 | Parker |
| 3,496,924 | A | 2/1970 | Miller |
| 3,529,589 | A | 9/1970 | Esser |
| 3,589,349 | A | 6/1971 | Parker |
| 3,819,179 | A | 6/1974 | Ambler et al. |
| 3,833,217 | A | 9/1974 | Greaney |
| 3,841,292 | A | 10/1974 | Hoffman |
| 3,844,555 | A | 10/1974 | Tremblay |
| 3,874,666 | A | 4/1975 | Ross |
| 3,897,058 | A | 7/1975 | Koch |
| 3,944,225 | A | 3/1976 | Greaney |
| 4,052,060 | A | 10/1977 | Balkcom |
| 4,214,751 | A | 7/1980 | Simpson |
| 4,236,271 | A | 12/1980 | Martino |
| 4,352,495 | A | 10/1982 | Marchionda |
| 4,717,155 | A | 1/1988 | Chu-Hwa |
| 4,752,076 | A * | 6/1988 | Gelinas, Jr. ............ A63B 59/20 273/109 |
| 4,834,376 | A | 5/1989 | Steinberg |
| 4,863,174 | A | 9/1989 | Cummings |
| 4,890,846 | A | 1/1990 | Spanski |
| 4,974,574 | A | 12/1990 | Cutlip |
| 5,024,435 | A | 6/1991 | Robbins |
| 5,054,778 | A | 10/1991 | Maleyko |
| 5,080,371 | A | 1/1992 | Karczewski |
| D325,612 | S | 4/1992 | Longo |
| 5,213,324 | A | 5/1993 | Bowers |
| D340,752 | S | 10/1993 | Flynn et al. |
| 5,269,511 | A | 12/1993 | Chavez |
| 5,333,867 | A | 8/1994 | DiVito |
| 5,383,661 | A | 1/1995 | Beck |
| 5,388,822 | A | 2/1995 | Cassady |
| 5,390,652 | A | 2/1995 | Minneman et al. |
| 5,395,107 | A | 3/1995 | DePippo |
| D358,859 | S | 5/1995 | Bernardo |
| 5,423,543 | A | 6/1995 | Tarrant |
| 5,452,891 | A | 9/1995 | Thomas |
| 5,501,451 | A | 3/1996 | Slusarczyk |
| 5,651,744 | A | 7/1997 | Millon et al. |
| 5,674,141 | A | 10/1997 | Laforest |
| 5,803,838 | A | 9/1998 | DeMarini et al. |
| 5,820,438 | A | 10/1998 | Horton |
| 5,888,154 | A | 3/1999 | Hartman |
| D413,641 | S | 9/1999 | Falco |
| 5,947,850 | A | 9/1999 | Gray |
| 6,076,829 | A * | 6/2000 | Oblack ............ A63B 59/20 124/5 |
| 6,186,909 | B1 | 2/2001 | Swanson |
| 6,241,629 | B1 | 6/2001 | Otto |
| 6,241,632 | B1 | 6/2001 | Obsniuk |
| 6,565,462 | B1 | 5/2003 | Gregg |
| 6,572,498 | B2 | 6/2003 | Nevers |
| 6,626,774 | B2 | 9/2003 | Sorbie |
| 6,719,651 | B1 | 4/2004 | Newey |
| 6,923,738 | B1 | 8/2005 | Fulp |
| 6,949,036 | B2 | 9/2005 | Ciesar et al. |
| 7,032,583 | B1 | 4/2006 | Hall |
| D525,670 | S | 7/2006 | Green |
| 7,112,153 | B1 | 9/2006 | Beu |
| 7,114,465 | B1 * | 10/2006 | Winter ............ A63B 65/12 119/707 |
| D537,893 | S | 3/2007 | Freeland |
| D539,859 | S | 4/2007 | Eldridge |
| 7,244,201 | B2 | 7/2007 | Hale |
| D585,513 | S | 1/2009 | Scheele |
| 7,677,994 | B2 | 3/2010 | Matsumoto et al. |
| 7,686,001 | B2 | 3/2010 | Fitt |
| 7,900,617 | B1 * | 3/2011 | Kersh ............ F41J 9/30 124/5 |
| 7,935,009 | B2 | 5/2011 | Mullin |
| 8,418,681 | B2 * | 4/2013 | Levin ............ A01K 15/025 124/5 |
| 8,857,419 | B2 | 10/2014 | Hansen |
| 2001/0034275 | A1 | 10/2001 | Dunnack et al. |
| 2002/0072436 | A1 | 6/2002 | Liu |
| 2003/0069095 | A1 | 4/2003 | Turos |
| 2006/0063616 | A1 | 3/2006 | Nye et al. |
| 2006/0094545 | A1 | 5/2006 | Blades |
| 2007/0111830 | A1 | 5/2007 | Wright |
| 2007/0155525 | A1 | 7/2007 | Davenport et al. |
| 2007/0277746 | A1 | 12/2007 | Piaget |
| 2008/0004140 | A1 | 1/2008 | Matsumoto et al. |
| 2008/0039241 | A1 | 2/2008 | Pope |
| 2008/0261729 | A1 | 10/2008 | Mullin |
| 2008/0261730 | A1 | 10/2008 | Mullin |
| 2008/0261732 | A1 | 10/2008 | Mullin |
| 2008/0314372 | A1 * | 12/2008 | Guindon ............ B60P 7/0853 124/5 |
| 2009/0025699 | A1 * | 1/2009 | Mongkolkasetarin A01K 15/025 124/26 |
| 2010/0197429 | A1 | 8/2010 | Mullin |
| 2010/0234146 | A1 | 9/2010 | Mullin |
| 2012/0227721 | A1 * | 9/2012 | Geller ............ A01K 15/025 124/5 |
| 2013/0192535 | A1 * | 8/2013 | Smith ............ A01K 15/025 119/707 |
| 2013/0284158 | A1 | 10/2013 | Hansen |
| 2014/0144417 | A1 * | 5/2014 | Evans ............ A63B 65/122 124/5 |
| 2015/0090237 | A1 * | 4/2015 | Williams ............ F41B 3/03 124/16 |

\* cited by examiner

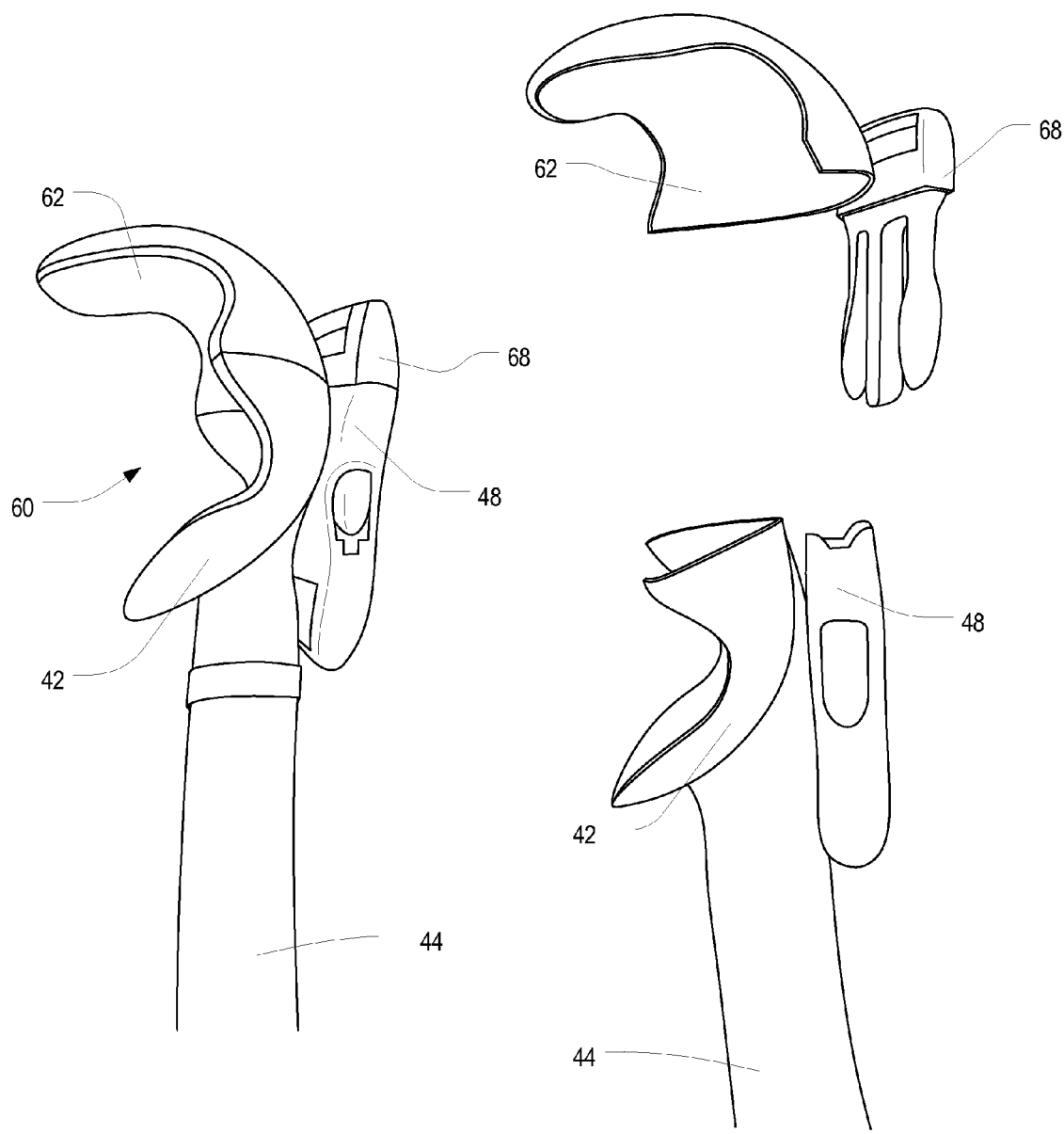
FIG. 5   FIG. 6

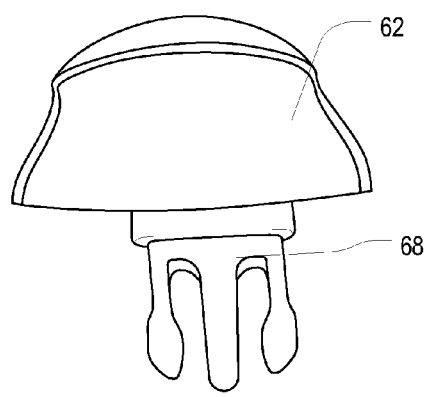
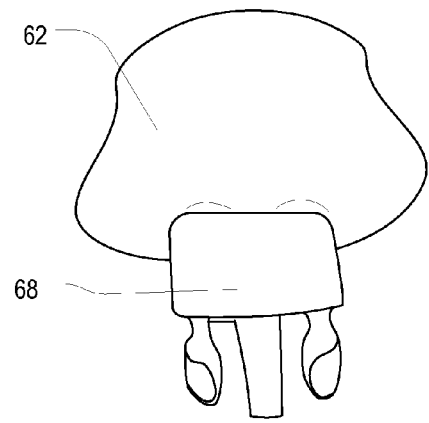
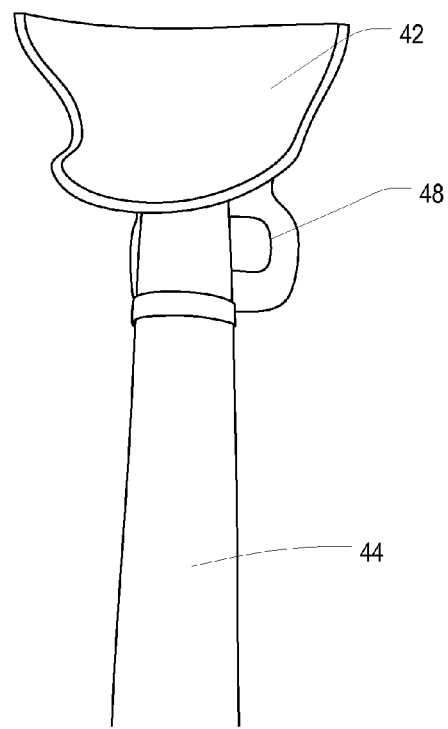
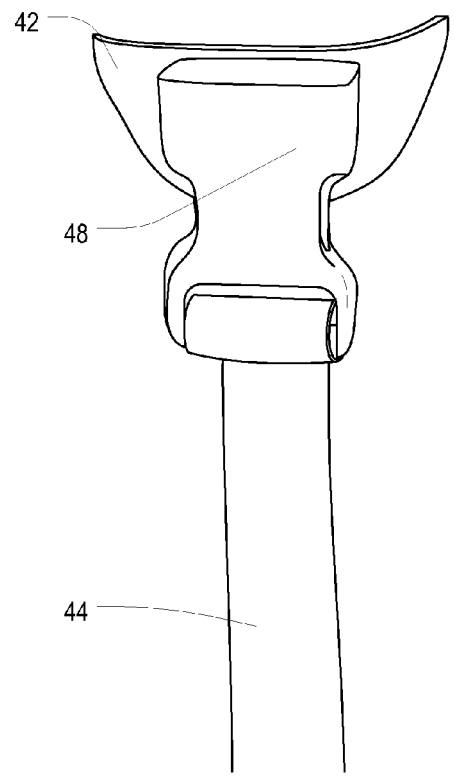
*FIG. 8*  *FIG. 9*

THROW AND FETCH EQUIPMENT AND SYSTEMS USING INTERCHANGEABLE PROJECTILE HOLDER ELEMENTS

CROSS-REFERENCE TO RELATED APPLICATION

The present application is a U.S. nonprovisional patent application of, and claims priority under 35 U.S.C. §119(e) to, U.S. provisional patent application Ser. No. 62/044,217, filed Aug. 30, 2014, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to pet toys, and, in particular, to throw and fetch equipment and systems using a variety of balls and/or other projectiles.

BACKGROUND

Many dogs are natural retrievers that enjoy retrieving objects such as sticks or balls, especially when the objects are thrown very far or with great force. Manually throwing such objects great distances for long periods of time, makes a person's back and arm tired before the animal is ready to rest.

To reconcile this problem, some individuals have resorted to using a bat, sling shot, tennis racket or ball wand launcher to throw a ball great distances. Unfortunately, such devices are only usable with a single type of projectile. This is primarily due to the shape of the launcher "socket" or "holder," which is typically shaped to match the shape of the projectile being launched. For example, launchers for spherical balls utilize sockets or holders that are in the form of a portion of a sphere. It is thus difficult for such launchers to be used with non-spherical projectiles.

In addition to one's back and arm becoming tired, another drawback of playing the game of fetch with a dog is having to physically pick up the ball with your hands. Typically, after a few throws, the ball is covered with dog saliva, which can be distasteful and unhealthy to touch. A further drawback is the possibility of getting bitten by the dog when initially picking the ball up off the ground after the dog has dropped it. Thus, some ball launchers have been developed which can be used to pick a ball or other projectile up without touching it.

Currently, there are several ball throwing devices available for pet owners whose dogs enjoy playing fetch for exercise and/or fun. Such devices range and have many various and different features, such as automatic or remote controlled operation, various ball gripping, grabbing or picking-up methods, man-powered to automatic and/or remote controlled, folding or telescopic wands, retracting, and such. Such prior art devices are disclosed, for example, in U.S. Pat. No. 1,535,029 to Murch, U.S. Pat. No. 3,428,036 to Parker, U.S. Pat. No. 3,589,349 to Parker, U.S. Pat. No. 3,841,292 to Hoffman, U.S. Pat. No. 4,974,574 to Cutlip, U.S. Pat. No. 5,390,652 to Minneman et al, U.S. Pat. No. 6,076,829 to Oblack, U.S. Pat. No. 7,686,001 to Fitt, U.S. Pat. No. 7,677,994 to Matsumoto et al, and U.S. Pat. No. 8,418,681 to Levin et al, as well as U.S. Patent Application Publication Nos. 2012/0227721 to Geller and 2013/0284158 to Hansen.

Of these prior art devices, the ball throwing apparatus shown in U.S. Pat. No. 6,076,829 is typical. The ball throwing apparatus includes an elongated shaft, having a longitudinal axis and opposite distal and proximal ends, and a ball holder in the form of a half-spherical structure integrally formed on the distal end of the elongated shaft. Such a ball holder is useful with spherical balls of a particular size, but not with other projectiles of other shapes or even with spherical balls of other sizes.

In view of the above, a need is believed to exist for a ball throwing or launching device and system that is adaptable for use with projectiles of different sizes and/or shapes to enable a user to "play fetch" with a dog or other pet in various environments.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

Broadly defined, the present invention according to one aspect is a throw and fetch apparatus, including: a universal handle; a projectile; and an interchangeable projectile holder element, having an interior that is sized and shaped to correspond to the size and shape of the projectile, wherein in a first state the projectile holder element is attached to a distal end of the universal handle, and wherein in a second state the interchangeable projectile holder element is detached from the distal end of the universal handle such that an alternative interchangeable projectile holder element, having an interior sized and shaped to correspond to an alternative projectile, may be attached thereto.

In a feature of this aspect, the universal handle includes a handgrip at a proximal end thereof, a projectile holder base for attachment to the interchangeable projectile holder element, and a shaft extending between the handgrip and the projectile holder base.

In further features, a projectile holder, adapted to receive the projectile and to release the projectile when the universal handle is whipped forward, is defined by one or more elements of the throw and fetch apparatus; the projectile holder is defined by a portion of the projectile holder base and a portion of the interchangeable projectile holder element; and/or the projectile holder is defined solely by the interchangeable projectile holder element.

In other further features, the projectile holder base includes a first fitting and the interchangeable projectile holder element includes a second fitting, the first and second fitting being couplable such that the interchangeable projectile holder element may be attached and detached from the projectile holder base; the first and second fittings are pieces of a buckle; the buckle is a snap-fit "parachute" buckle; and/or the first and second fittings are threaded fittings that may be screwed together.

Broadly defined, the present invention according to another aspect is a throw and fetch system, including: a universal handle; a first projectile, having a first size and/or shape; a first interchangeable projectile holder element, having an interior that is sized and shaped to correspond to the size and shape of the first projectile; a second projectile, having a second size and/or shape, the second size and/or shape being different from the first size and/or shape; and a second interchangeable projectile holder element, having an interior that is sized and shaped to correspond to the size and shape of the second projectile; wherein in a first state the first projectile holder element is attached to a distal end of the universal handle such that the first projectile may be held then thrown therefrom by a user; and wherein in a second state the second projectile holder element is attached to the distal end of the universal handle such that the second projectile may be held then thrown therefrom by the user.

In a feature of this aspect, the universal handle includes a handgrip at a proximal end thereof, a projectile holder base for attachment to the interchangeable projectile holder element, and a shaft extending between the handgrip and the projectile holder base.

In further features, a projectile holder, adapted to receive the projectile and to release the projectile when the universal handle is whipped forward, is defined by one or more elements of the throw and fetch apparatus; the projectile holder is defined by a portion of the projectile holder base and a portion of the first or second interchangeable projectile holder element; and/or the projectile holder is defined solely by the first or second interchangeable projectile holder element.

In other further features, the projectile holder base includes a first fitting and each interchangeable projectile holder element includes a second fitting, the first and either of the second fittings being couplable such that the respective interchangeable projectile holder element may be attached and detached from the projectile holder base; the first and second fittings are pieces of a buckle; the buckle is a snap-fit "parachute" buckle; and/or the first and second fittings are threaded fittings that may be screwed together.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein:

FIG. 5 is a fragmentary side view of portions of the projectile thrower of FIG. 2;

FIG. 6 is a side view of the of the projectile thrower portions of FIG. 5, shown in a disassembled state;

FIG. 8 is a front view of the projectile thrower portions of FIG. 6;

FIG. 9 is a rear view of the projectile thrower portions of FIG. 6;

DETAILED DESCRIPTION

Figure 1:
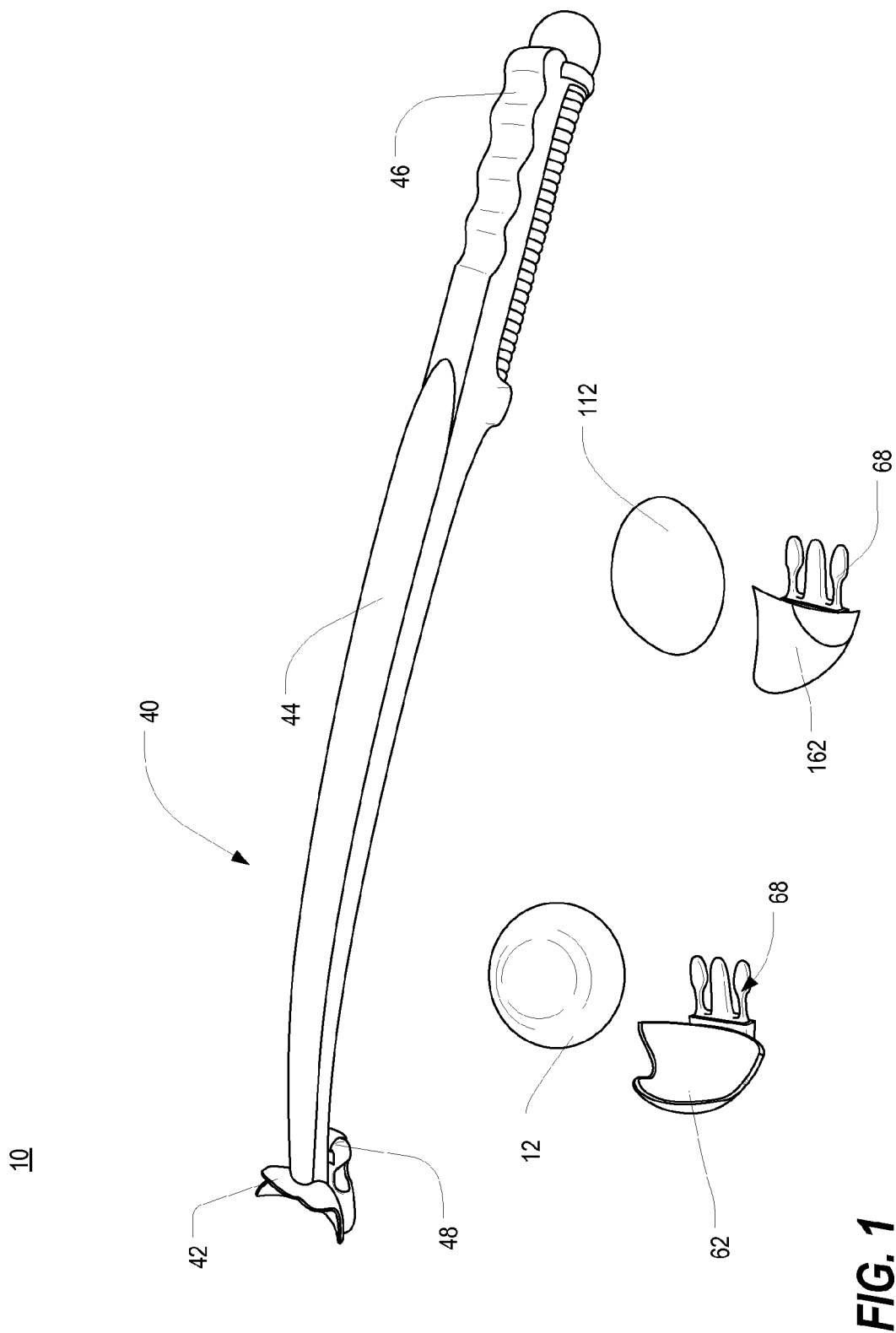
FIG. 1 is a perspective view of elements of a throw and fetch system utilizing interchangeable projectile holders in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiments is merely exemplary in nature and is in no way intended to limit the invention, its implementations, or uses.

FIG. 1 is a perspective view of elements of a throw and fetch system 10 utilizing interchangeable projectile holders in accordance with one or more preferred embodiments of the present invention. As shown therein, the system includes a universal handle 40, one or more projectiles 12,112, and one or more interchangeable projectile holder elements 62,162. The system 10, and particularly the interchangeable projectile holder elements 62,162, enables a user 101,102 to throw or otherwise launch projectiles of different shapes and sizes for retrieval by a pet 104. It will be appreciated that such a system 10 may be utilized with any pet that can be taught or trained to retrieve a ball or other object, but that the system 10 may find particular utility with dogs, and thus the system 10 will be described herein with particular regard to dogs.

The illustrated handle 40, which may sometimes be referred to as a "wand," includes a projectile holder base 42, a shaft 44, and a handgrip 46. It will be appreciated that the particular handle 40 shown in FIG. 1, and particularly the shaft 44 and handgrip 46 thereof, is exemplary only, and that the shape, dimensions, elements, and general form factor of the ball thrower may be varied considerably without departing from the scope of the present invention. For example, the handle 40 may take the form of a bat, paddle, tennis racket, lacrosse stick, cesta, scoop, slingshot, or the like, or alternatively may be in some cases be an automatic launching device, such as a tennis ball thrower or other specialized projectile launching device.

Figure 2:
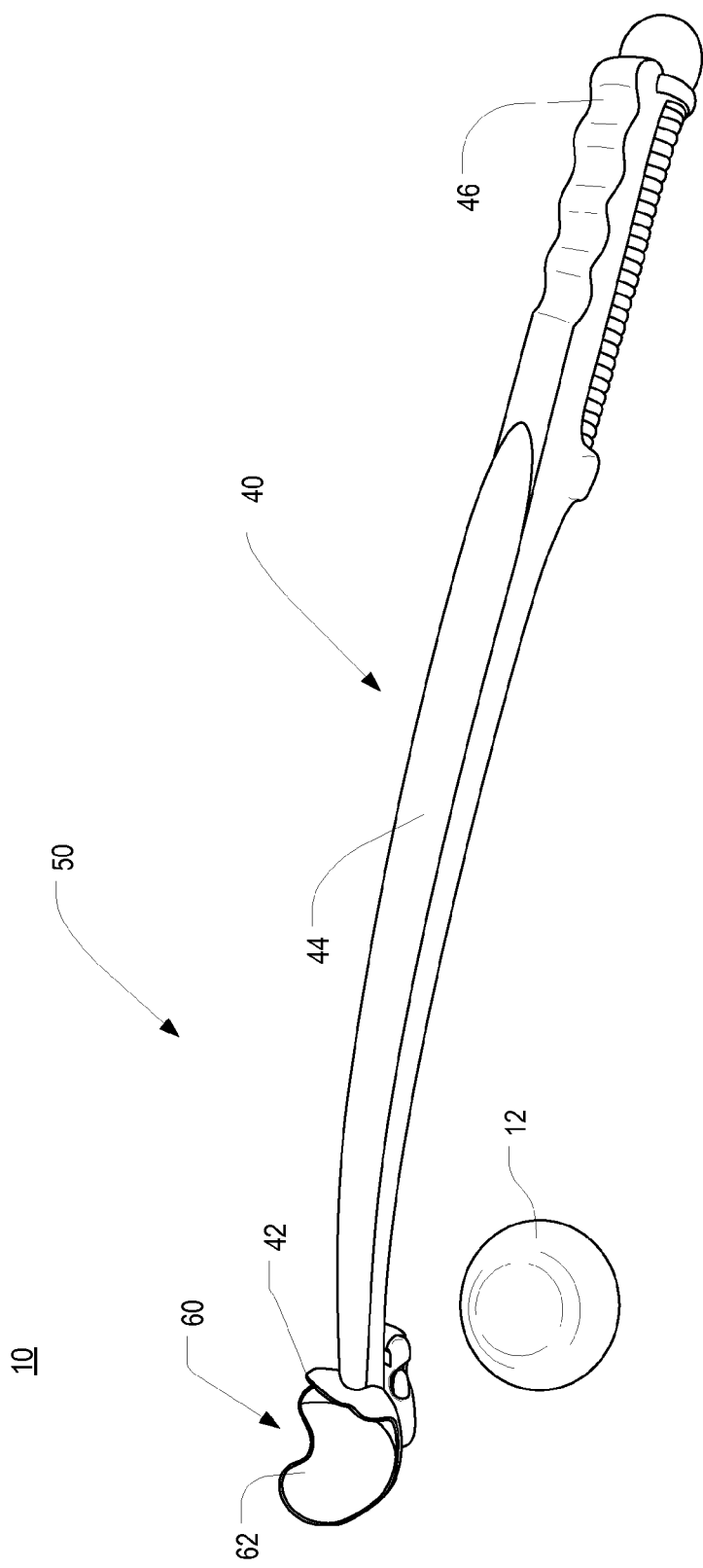
FIG. 2 is a perspective view of portions of the throw and fetch system of FIG. 1, wherein one of the interchangeable projectile holder elements has been attached to the universal handle.

Use of the system 10 involves a user 101,102 selecting a desired projectile 12,112 and attaching a corresponding projectile holder element 62,162 to the universal handle 40. In this regard, FIG. 2 is a perspective view of portions of the throw and fetch system 10 of FIG. 1, wherein one of the interchangeable projectile holder elements 62 has been attached to the universal handle 40. In particular, a projectile holder element 62 that is in the approximate form of a quarter of a sphere has been selected from the available projectile holder elements 62,162 and attached to the projectile holder base 42. The selected projectile holder element 62 and the projectile holder base 42 together form a projectile holder 60 that is particularly suitable for use with the spherical ball 12 of the size shown in FIGS. 1 and 2.

Figure 3:
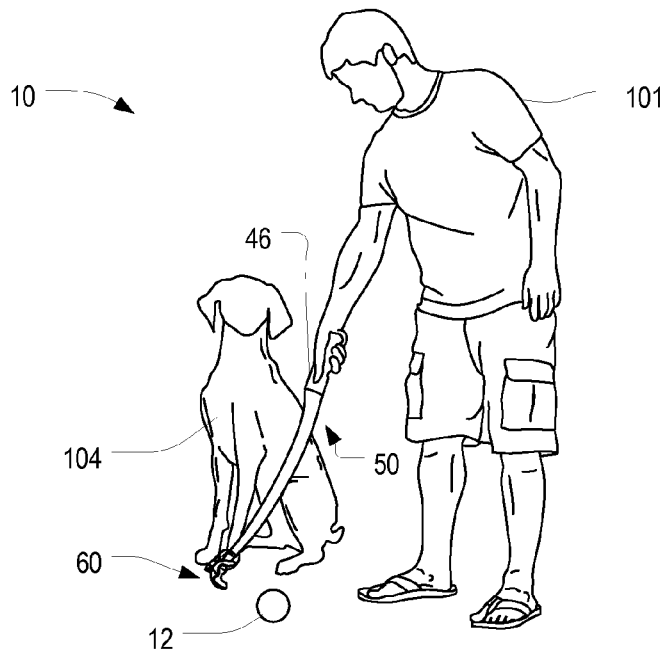
FIG. 3 is an environmental view of a user picking up or retrieving the spherical ball as part of a method of using the system of FIG. 1 in accordance with one or more preferred embodiments of the present invention.
Figure 4:
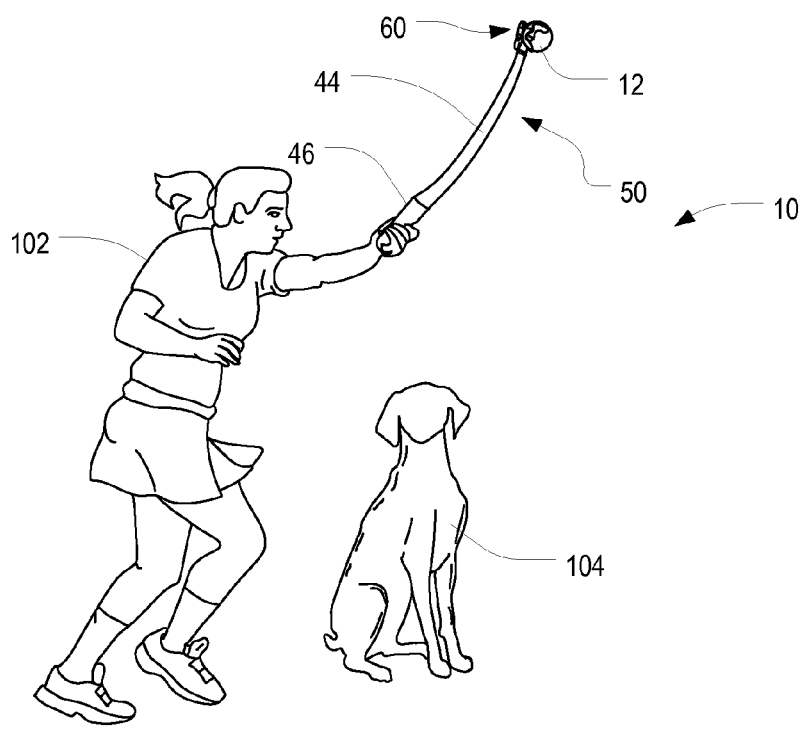
FIG. 4 is an environmental view of a user throwing the spherical ball as part of a method of using the system of FIG. 1 in accordance with one or more preferred embodiments of the present invention.
Figure 7:
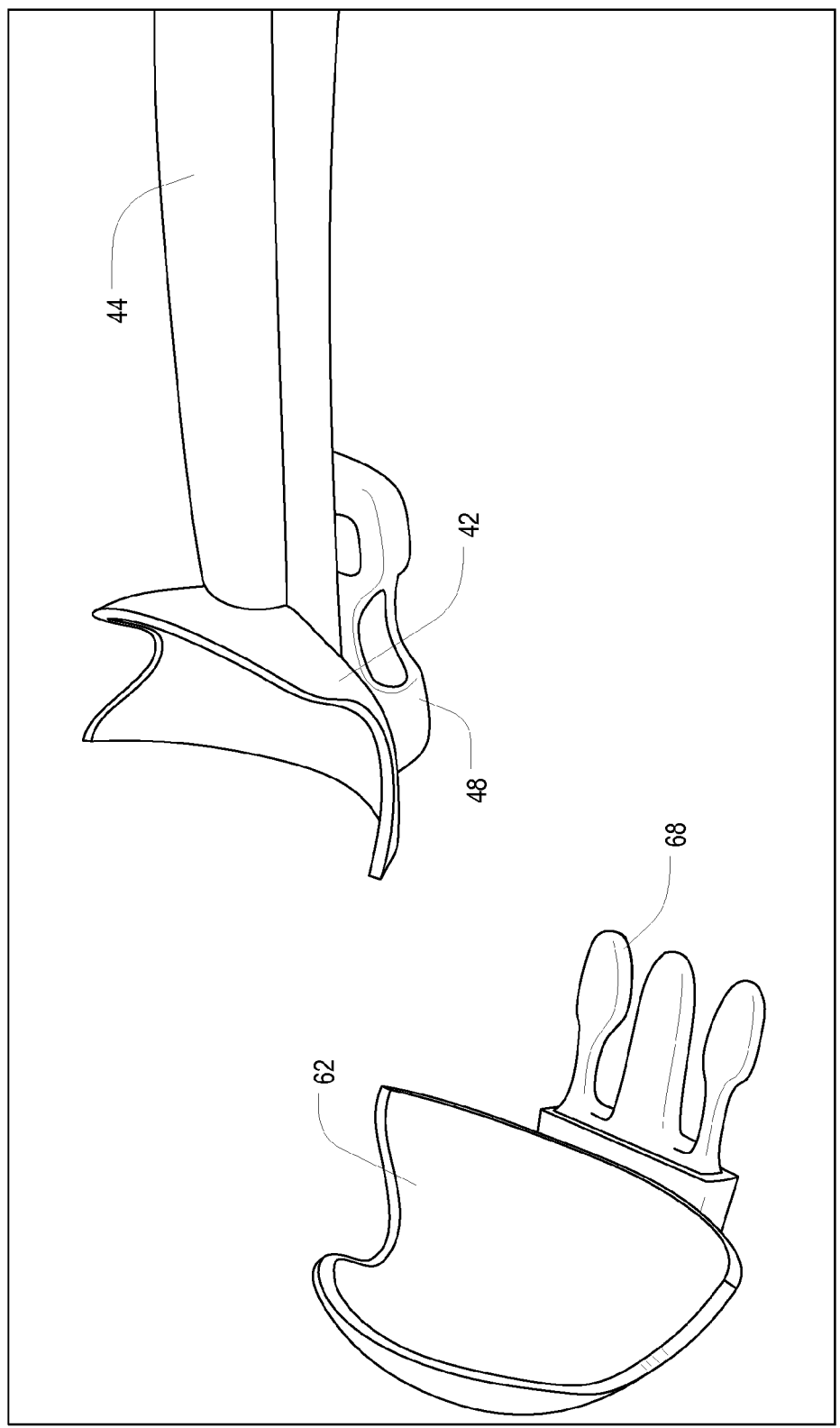
FIG. 7 is a front/side perspective view of the projectile thrower portions of FIG. 6.

Once a ball or other projectile 12 is selected and the corresponding projectile holder element 62 attached, the ball thrower 50 is ready for use. In at least some embodiments, the ball thrower 50 is used to throw or launch the ball 12, and in at least some of these embodiments, the assembled ball thrower may also be utilized to lift the ball 12 from the ground so that it need not be touched by the user's hand. By way of example, FIG. 3 is an environmental view of a user 101 picking up or retrieving the spherical ball 12 as part of a method of using the system 10 of FIG. 1 in accordance with one or more preferred embodiments of the present invention. In particular, the user 101 is holding the ball thrower 50 by the handgrip 46 and using the ball holder 60 to scoop the ball 12 up so that it can be cradled therein. FIG. 4 is an environmental view of a user 102 throwing the spherical ball 12 as part of a method of using the system 10 of FIG. 1 in accordance with one or more preferred embodiments of the present invention. In particular, the user 102 is holding the ball thrower 50 by the handgrip 46, with the ball 12 still cradled in the ball holder 60, and whipping the thrower 50 forward such that the ball 12 is thrown or launched from the ball holder 60 to achieve a desired trajectory and travel distance. Assuming the dog 104 is trained to do so, the intent is for the dog 104 to follow the ball 12 (or in some cases to intercept that ball 12 along its trajectory) and return or fetch the ball 12 to the user 101,102.

The interchangeable projectile holder elements 62,162 may be attached to the projectile holder base 42 in any of a variety of ways. In the illustrated embodiments, the projectile holder base 42 includes one piece (half) 48 of a conventional snap-fit buckle of nylon, other thermoplastic polymers, or the like, while each projectile holder elements 62,162 includes a corresponding piece (half) 68 of such a buckle. In this regard, FIG. 5 is a fragmentary side view of portions of the projectile thrower 50 of FIG. 2, and FIGS. 6-9 are a side view, a front/side perspective view, a front view, and a rear view, respectively, of the projectile thrower portions of FIG. 5, shown in a disassembled state. As shown therein, the half-spherical ball holder 60 of FIG. 5 is formed from two quarter-spherical sections, wherein one of the quarter-spherical sections is part of the projectile holder base 42 and the other quarter-spherical section is part of the projectile holder element 62. Notably, it will be appreciated that other connection/attachment mechanisms may be substituted for the "parachute"-type buckle illustrated in the various drawings without departing from the present invention. For example, threaded fittings (not shown) may be utilized to allow the interchangeable projectile holder elements 62,162 to be screwed onto the projectile holder base 42.

Figure 10:
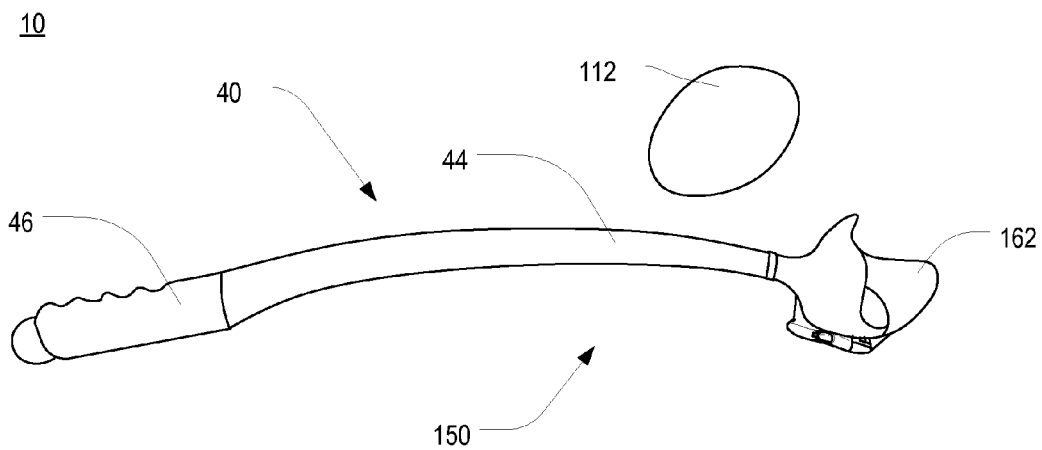
FIG. 10 is a perspective view of portions of the throw and fetch system of FIG. 1, wherein another interchangeable projectile holder element has been attached to the universal handle to form an alternative projectile thrower.
Figure 11:
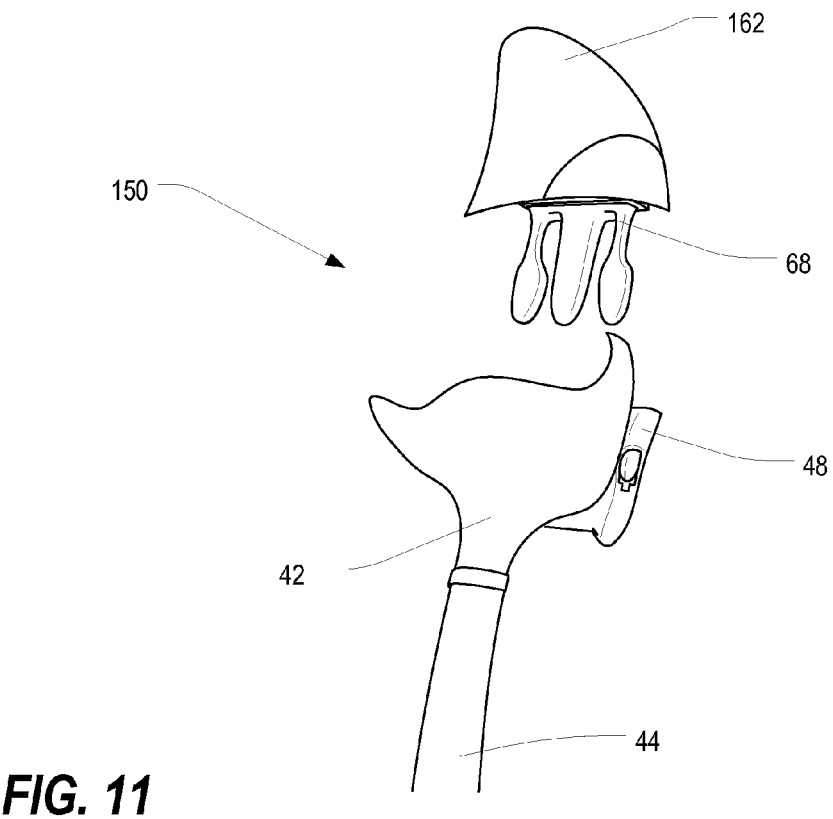
FIG. 11 is a fragmentary front/side view of portions of the projectile thrower of FIG. 10, shown in a disassembled state.

Regardless of the connection mechanism utilized, however, it is preferred that the mechanism be easily releasable so that an alternative projectile holder element, such as the alternative projectile holder element 162 illustrated in FIG. 1, may be used instead. In this regard, FIG. 10 is a perspective view of portions of the throw and fetch system 10 of FIG. 1, wherein another interchangeable projectile holder element 162 has been attached to the universal handle 40 to form an alternative projectile thrower 150, and FIG. 11 is a fragmentary front/side view of portions of the projectile thrower 150 of FIG. 10, shown in a disassembled state. As shown therein, the quarter-spherical projectile holder element 62 of FIGS. 2-9 has thus been replaced with an elongated projectile holder element 162 that is more suitable for a prolate or elongated spheroid projectile, American football-shaped projectile, or the like. Like the first projectile holder element 62, this alternative projectile holder element 162 has a buckle piece (half) 68 that mates with the buckle piece (half) 48 on the projectile holder base 42. As illustrated thereby, the interchangeable projectile holder elements 62,162 may be detached from the projectile holder base 42 and replaced with any number of alternative projectile holder elements to accommodate balls, discs, and other projectiles of different sizes and/or shapes.

It will be appreciated that in some embodiments, the projectile holder base 42 may be primarily comprised only of a fitting, such as the illustrated buckle piece 48, and that the interchangeable projectile holder elements may each comprise an entire projectile holder with a corresponding fitting, such as the other illustrated buckle piece 68, wherein the two buckle pieces 48,68 may be coupled together to attach the interchangeable projectile holder to the projectile holder base. Such an arrangement would enable the entire projectile holder to be customized for a particular projectile size or shape, rather than limiting the customization to the types of interchangeable elements 62,162 shown in FIGS. 1-11. However, such an arrangement may increase the manufacturing cost of the interchangeable portions due to increased material requirements and/or create other difficulties in manufacturing or otherwise.

Notably, the various projectile throwers and systems described and/or illustrated herein may also be adapted for use with other projectile thrower technologies. In one example, lighting effects may be added as described, for example, in commonly-assigned U.S. patent application Ser. No. 14/751,398, filed Jun. 26, 2015 and entitled "LIGHTED THROW AND FETCH EQUIPMENT AND SYSTEMS," the entirety of which is attached as APPENDIX A and incorporated herein by reference. In another example, technology for use with mobile devices may be added as described, for example, in commonly-assigned U.S. patent application Ser. No. 14/673,361, filed Mar. 30, 2015 and entitled "PET TOY LAUNCHING SYSTEM AND METHOD FOR USE WITH MOBILE DEVICES," the entirety of which is attached as APPENDIX B and incorporated herein by reference. Notably, the use of a universal handle enables such technologies to be implemented in the shaft or handgrip of the handle without need for replacement when use with a different projectile is desired, thereby providing significant cost savings to the user 101,102.

It will be appreciated, however, that the particular projectiles 12,112 shown in FIG. 1 are exemplary only, that other projectile types may be utilized. Notably, the shape, dimensions, elements, and general form factor of the balls 12,112 or other projectiles, as well as any decorative features, may be varied considerably without departing from the scope of the present invention. For example, the ball may be round (spherical) (with or without perforations), or it may be a flying disc (with or without perforations), or it may be a spheroid (sphere-like but not spherical), including prolate spheroids, or it may take various abstract shapes. The ball or other projectile may be of proprietary design, or third party products may in some cases be utilized as the ball or other projectile 12,112.

In some embodiments, a universal handle, a plurality of balls or other projectiles, and a plurality of interchangeable projectile holder elements are marketed and sold as a single kit. The kit may be contained together in a single box or other package. In other embodiments, the balls or other projectiles and/or corresponding interchangeable projectile holder elements may be marketed and/or sold separately or omitted entirely. Furthermore, ball throwers of different lengths, ball holder sizes, projectile types, and interchangeable projectile holder elements may be offered as part of a commonly-branded and/or marketed product line.

In summary, the ball throwers described herein are used to launch balls and other projectiles. The universal handle may be utilized with projectiles of different shapes and sizes by utilizing different projectile holders, each being created by attaching an interchangeable projectile holder element to a projectile holder base.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A throw and fetch apparatus, comprising:
   a universal handle;
   a projectile;
   an interchangeable projectile holder element, having an interior that is sized and shaped to correspond to the size and shape of the projectile, wherein in a first state the projectile holder element is attached to a distal end of the universal handle, and wherein in a second state the interchangeable projectile holder element is detached from the distal end of the universal handle such that an alternative interchangeable projectile holder element, having an interior sized and shaped to correspond to an alternative projectile, may be attached thereto; and
   wherein the universal handle includes a handgrip at a proximal end thereof, a projectile holder base for attachment to the interchangeable projectile holder element, and a shaft extending between the handgrip and the projectile holder base.

2. The throw and fetch apparatus of claim 1, wherein a projectile holder, adapted to receive the projectile and to release the projectile when the universal handle is whipped forward, is defined by one or more elements of the throw and fetch apparatus.

3. The throw and fetch apparatus of claim 2, wherein the projectile holder is defined by a portion of the projectile holder base and a portion of the interchangeable projectile holder element.

4. The throw and fetch apparatus of claim 2, wherein the projectile holder is defined solely by the interchangeable projectile holder element.

5. The throw and fetch apparatus of claim 1, wherein the projectile holder base includes a first fitting and the interchangeable projectile holder element includes a second fitting, the first and second fitting being couplable such that the interchangeable projectile holder element may be attached and detached from the projectile holder base.

6. The throw and fetch apparatus of claim 5, wherein the first and second fittings are pieces of a buckle.

7. The throw and fetch apparatus of claim 6, wherein the buckle is a snap-fit "parachute" buckle.

8. The throw and fetch apparatus of claim 5, wherein the first and second fittings are threaded fittings that may be screwed together.

9. A throw and fetch system, comprising:
a universal handle;
a first projectile, having a first size and/or shape;
a first interchangeable projectile holder element, having an interior that is sized and shaped to correspond to the size and shape of the first projectile;
a second projectile, having a second size and/or shape, the second size and/or shape being different from the first size and/or shape; and
a second interchangeable projectile holder element, having an interior that is sized and shaped to correspond to the size and shape of the second projectile;
wherein in a first state the first projectile holder element is attached to a distal end of the universal handle such that the first projectile may be held then thrown therefrom by a user;
wherein in a second state the second projectile holder element is attached to the distal end of the universal handle such that the second projectile may be held then thrown therefrom by the user; and
wherein the universal handle includes a handgrip at a proximal end thereof, a projectile holder base for attachment to the interchangeable projectile holder element, and a shaft extending between the handgrip and the projectile holder base.

10. The throw and fetch system of claim 9, wherein a projectile holder, adapted to receive the projectile and to release the projectile when the universal handle is whipped forward, is defined by one or more elements of the throw and fetch apparatus.

11. The throw and fetch system of claim 10, wherein the projectile holder is defined by a portion of the projectile holder base and a portion of the first or second interchangeable projectile holder element.

12. The throw and fetch system of claim 10, wherein the projectile holder is defined solely by the first or second interchangeable projectile holder element.

13. The throw and fetch system of claim 9, wherein the projectile holder base includes a first fitting and each interchangeable projectile holder element includes a second fitting, the first and either of the second fittings being couplable such that the respective interchangeable projectile holder element may be attached and detached from the projectile holder base.

14. The throw and fetch system of claim 13, wherein the first and second fittings are pieces of a buckle.

15. The throw and fetch system of claim 14, wherein the buckle is a snap-fit "parachute" buckle.

16. The throw and fetch system of claim 13, wherein the first and second fittings are threaded fittings that may be screwed together.

* * * * *